(12) United States Patent
Wang et al.

(10) Patent No.: US 9,220,120 B2
(45) Date of Patent: Dec. 22, 2015

(54) METHOD, DEVICE AND SYSTEM FOR TRANSMITTING PACKET SERVICE DATA

(75) Inventors: Shujuan Wang, Shenzhen (CN); Yongxian Zhao, Shanghai (CN); Ming Li, Shenzhen (CN); Minchang Yang, Shenzhen (CN); Wenyuan Yong, Shanghai (CN); Shengyi Qin, Shanghai (CN); Yu Shao, Munich (DE); Wei Gu, Shanghai (CN); Guangwei Wang, Shanghai (CN); Xiaoying Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 786 days.

(21) Appl. No.: 13/339,199

(22) Filed: Dec. 28, 2011

(65) Prior Publication Data

US 2012/0099438 A1 Apr. 26, 2012

Related U.S. Application Data

(63) Continuation of application No. PCT/CN2010/075214, filed on Jul. 16, 2010.

(30) Foreign Application Priority Data

Jul. 17, 2009 (CN) .......................... 2009 1 0158046

(51) Int. Cl.
*H04L 1/00* (2006.01)
*H04L 12/26* (2006.01)
(Continued)

(52) U.S. Cl.
CPC ........ *H04W 76/022* (2013.01); *H04W 36/0016* (2013.01); *H04W 36/0022* (2013.01); *H04W 36/0033* (2013.01); *H04W 8/082* (2013.01)

(58) Field of Classification Search
CPC ............ H04W 36/00; H04W 36/0005; H04W 36/0011; H04W 36/0016; H04W 36/0022; H04W 36/0033; H04W 8/082; H04W 76/022
See application file for complete search history.

(56) References Cited

U.S. PATENT DOCUMENTS

2004/0095912 A1\* 5/2004 Gao et al. ...................... 370/338
2006/0270411 A1\* 11/2006 Grayson ....................... 455/444

(Continued)

FOREIGN PATENT DOCUMENTS

CN        1808982 A    7/2006
CN     101218764 A    7/2008

(Continued)

OTHER PUBLICATIONS

Office Action issued in corresponding Chinese Patent Application No. 200910158046.5, mailed Mar. 19, 2013.
(Continued)

*Primary Examiner* — Lonnie Sweet
(74) *Attorney, Agent, or Firm* — Brinks Gilson & Lione

(57) ABSTRACT

A method, device and system for transmitting packet service data are provided. The method includes the steps of: receiving the packet service data transmitted by a user equipment; determining the packet service data to be uninstalled in the packet service data according to the service uninstall strategy of the user equipment; and transmitting the packet service data to be uninstalled to the packet data network via a metropolitan-area network and an internet protocol (IP) backbone network. By applying this method, the problem in the prior art is overcome, thereby saving the operation and maintenance cost of the packet network.

16 Claims, 8 Drawing Sheets

(51) Int. Cl.
  *H04J 3/14* (2006.01)
  *H04J 1/16* (2006.01)
  *H04W 76/02* (2009.01)
  *H04W 36/00* (2009.01)
  *H04W 8/08* (2009.01)

(56) References Cited

U.S. PATENT DOCUMENTS

| | | |
|---|---|---|
| 2007/0036109 A1* | 2/2007 | Kwak et al. ............... 370/331 |
| 2008/0232306 A1 | 9/2008 | Kopplin et al. |
| 2012/0057550 A1 | 3/2012 | Zhao et al. |

FOREIGN PATENT DOCUMENTS

| | | |
|---|---|---|
| CN | 101248629 A | 8/2008 |
| CN | 101883393 A | 11/2010 |
| EP | 1833193 A1 | 9/2007 |
| WO | WO 2008/110215 A1 | 9/2008 |
| WO | WO 2008110215 A1 | 9/2008 |

OTHER PUBLICATIONS

Extended European Search Report issued in corresponding European Patent Application No. 10799445.1, mailed Jul. 23, 2012.

Huawei, "Lifting Content From TR 23.830 to Local IP Access and Internet Offload TR" Agenda 9.1, 3GPP TSG WG2 Meeting #74. Sophia Antipolis, France, Jul. 6-10, 2009. TD S2-094957.

China Mobile, "Local IP Access Principles for Single PDN Connection Solutions" Change Request 23.401 CR 1003, version 9.0.0. 3GPP TSG-SA2 Meeting #73. Tallin, Estonia, May 11-15, 2009. S2-093803.

Vodaphone, "3G Macro and HNB-GW non-S4 Local Breakout using GGSN Allocation" 3GPP TSG SA WH2 Meeting #74. Sophia Antipolis, France, Jul. 6-10, 2009. TD S2-094576.

Office Action issued in corresponding Chinese Patent Application No. 200910158046.5, mailed Jul. 30, 2012.

GSM, "3$^{rd}$ Generation Partnership Project; Technical Specification Group Services and System Aspects' Policy and Charging Control Architecture" (Release 7) 3GPP TS 23.203. V7.11.0, Jun. 2009.

Huawei, "Lifting Content from TR 23.830 to Local IP Access and Internet Offload TR" Agenda Item 9.1, 3GPP TSG SA WG2 Meeting #74. Sophia Antipolis, France, Jul. 6-10, 2009. TD S2-094957.

China Mobile, "Local IP Access Principles for Single PDN Connection Solutions" Change Request 23.401 CR 1003, Rev. 1, ver. 9.0.0. 3GPP TSG-SA2 Meeting #73, Tallin, Estonia, May 11-15, 2009, S2-093803.

Vodaphone, "3G Macro and HNB-GW non-S4 Local Breakout Using GGSN Allocation" 3GPP TSG SA WG2 Meeting #74. Sophia Antipolis, France, Jul. 6-10, 2009.

Yijun, "Softswitch Technology" Information Technology & Network Service, No. 5, 2005.

International Search Report issued in corresponding PCT Patent Application No. PCT/CN2010/075214, mailed on Nov. 4, 2010.

Written Opinion of the International Searching Authority issued in corresponding PCT Patent Application No. PCT/CN2010/075214, mailed Nov. 4, 2010.

\* cited by examiner

METHOD, DEVICE AND SYSTEM FOR TRANSMITTING PACKET SERVICE DATA

CROSS-REFERENCE TO RELATED APPLICATIONS

This application is a continuation of International Application No. No. PCT/CN2010/075214, filed on Jul. 16, 2010, which claims priority to Chinese Patent Application No. 200910158046.5, filed on Jul. 17, 2009, both of which are hereby incorporated by reference in their entireties.

FIELD

The present disclosure relates to the field of communication, and particularly to a method, a device and a system, which are used for transmitting packet service data.

BACKGROUND

As illustrated in FIG. 1, in the Packet Switch (PS) network of the Wide Code Division Multiplex Access (WCDMA) system, after being accessed by the User Equipment (UE), a NodeB receives the packet service data transmitted by the UE, allocates a network bandwidth for the UE according to the traffic volume of the packet service data, and transmits the packet service data to a Radio Network Controller (RNC) via a Mobile backhaul. The RNC converges the packet service data and then transmits the packet service data to public data network via a Serving GPRS Support Node (SGSN), an IP backbone and a Gateway GPRS Support Node (GGSN) by way of GPRS Tunneling Protocol-User plane GPRS (GTPU), wherein a packet service server in the public data network provides the UE with services.

In the process of implementing the present disclosure, the inventor found that in the packet network as illustrated in FIG. 1, the path for transmitting the packet service data is long and many network equipments are passed through. When the packet service data (e.g., the Internet service data) occupies a large network bandwidth, the operation and maintenance cost of the packet network will be high.

SUMMARY

The embodiments of the present disclosure provide a method, a device and a system, which are used for transmitting packet service data, so as to solve the problem of the strategy control during implementing service uninstall in the network, and save the operation and maintenance cost of the packet network.

The embodiments of the present disclosure adopt the following solutions:

In one aspect, the embodiments of the present disclosure provide a method and a device, for transmitting packet service data.

A method for transmitting packet service data, includes: receiving the packet service data transmitted by a User Equipment (UE); determining packet service data to be uninstalled in the packet service data according to a service uninstall strategy of the UE, wherein the service uninstall strategy is generated according to user information or signaling information of a service distributing point; and transmitting the determined packet service data to be uninstalled to a Packet Data Network (PDN).

A service distributing device, includes: a receiving module configured to receive packet service data transmitted by a UE; a determining module configured to determine packet service data to be uninstalled in the packet service data received by the receiving module according to service uninstall strategy of the UE, wherein the service uninstall strategy is generated according to user information or signaling information of a service distributing point; and a transmitting module configured to transmit the packet service data to be uninstalled determined by the determining module to a Packet Data Network (PDN).

In another aspect, the embodiments of the present disclosure provide another method and device for transmitting packet service data.

A method for transmitting packet service data, includes: acquiring identification information of a UE; and transmitting a service uninstall strategy corresponding to the UE according to the identification information of the UE thereby enabling a receiving party to transmit the packet service data of the UE according to the service uninstall strategy of the UE.

A Policy and Charging Rule Function (PCRF) entity, includes: an acquiring module configured to acquire identification information of a UE; and a transmitting module configured to transmit a service uninstall strategy of the UE according to the identification information of the UE acquired by the acquiring module thereby enabling a receiving party to transmit the packet service data of the UE according to the service uninstall strategy of the UE.

In addition, the embodiments of the present disclosure provide a communication system, includes: a service distributing device configured to receive packet service data transmitted by a UE, determine packet service data to be uninstalled in the packet service data according to a service uninstall strategy of the UE, wherein the service uninstall strategy is generated according to user information or signaling information of a service distributing point, and transmit the determined packet service data to be uninstalled to a Packet Data Network (PDN); and a Policy and Charging Rule Function (PCRF) entity configured to acquire identification information of the UE, and transmit the service uninstall strategy of the UE to the service distributing device according to the identification information of the UE thereby enabling the service distributing device to transmit the packet service data of the UE according to the service uninstall strategy of the UE.

The method, device and system for transmitting packet service data provided by the embodiments of the present disclosure determine the packet service data to be uninstalled in the packet service data according to the service uninstall strategy of the UE, and transmit the packet service data to be uninstalled to the PDN via the metropolitan-area network and the IP backbone network, thereby achieving the objects of saving the operation and maintenance cost of the packet network, and overcoming the problem of a high operation and maintenance cost of the packet network when the packet service data (e.g., the Internet service data) occupying a large bandwidth are transmitted, which is caused by that all packet service data transmitted by the UE need to be transmitted via the mobile backhaul, the RNC, the SGSN, the IP backbone network and the GGSN in the prior art.

DETAILED DESCRIPTION OF THE PREFERRED EMBODIMENTS

The solutions in the embodiments of the present disclosure will be clearly and completely described below in conjunction with the drawings in the embodiments of the present disclosure. Apparently, the described embodiments are just part of embodiments of the present disclosure rather than all of the embodiments. Based on the embodiments of the present disclosure, all the other embodiments obtained by the persons skilled in the art without paying any creative effort will fall within the protection scope of the present disclosure.

The present disclosure will be further explained below in conjunction with the specific embodiments and the drawings.

Figure 1:
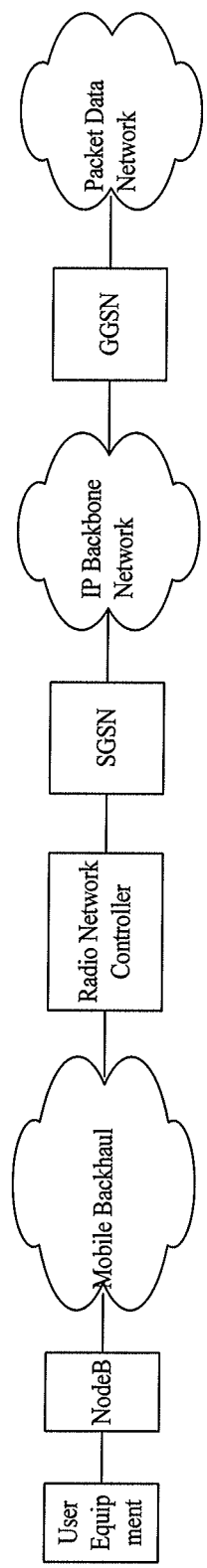
FIG. 1 illustrates an architecture diagram of the PS network of the WCDMA system in the prior art.
Figure 2:
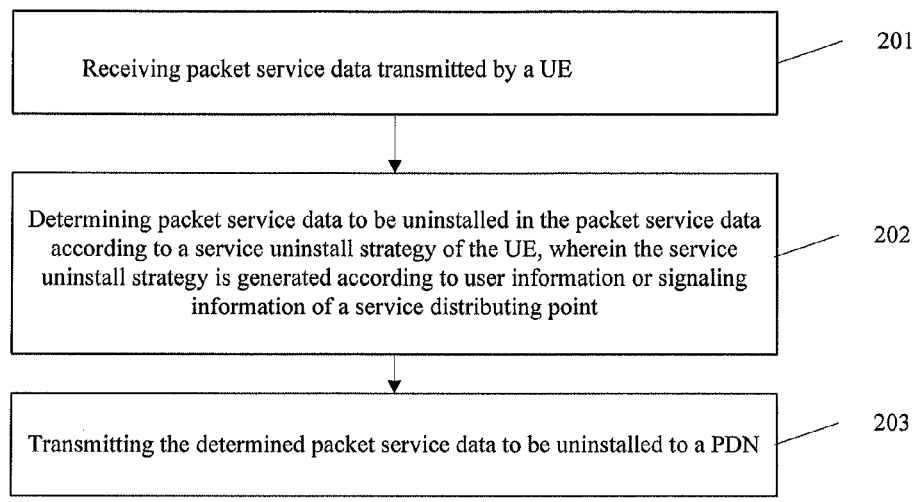
FIG. 2 illustrates a flowchart of a method for transmitting packet service data according to an embodiment of the present disclosure.

As illustrated in FIG. 2, an embodiment of the present disclosure provides a method for transmitting packet service data, including:

Step 201: receiving the packet service data transmitted by a UE;

Step 202: determining packet service data to be uninstalled in the packet service data according to a service uninstall strategy of the UE, wherein the service uninstall strategy is generated according to user information or signaling information of a service distributing point;

wherein, the user information is public information including subscription information and private information including whether or not the user is an intercepting user or roaming user; the signaling information is a signaling for setting up transport bearer, and the signaling information may be the bandwidth, destination address or access method of the bearer.

Step 203: transmitting the determined packet service data to be uninstalled to a Packet Data Network (PDN).

The method for transmitting packet service data provided by an embodiment of the present disclosure may determine the packet service data to be uninstalled in the packet service data according to the service uninstall strategy corresponding to the UE, and transmit the packet service data to be uninstalled to the PDN via the metropolitan-area network and the IP backbone network, thereby achieving the objects of saving the operation and maintenance cost of the packet network, and overcoming the problem of a high operation and maintenance cost of the packet network when the packet service data (e.g., the Internet service data) occupying a large bandwidth are transmitted, which is caused by that all packet service data transmitted by the UE need to be transmitted via the mobile backhaul, the RNC, the SGSN, the IP backbone network and the GGSN in the prior art and that the packet service data of the UE are transmitted via the mobile backhaul, the RNC, the SGSN, the IP backbone network and the GGSN in the prior art.

Figure 3:
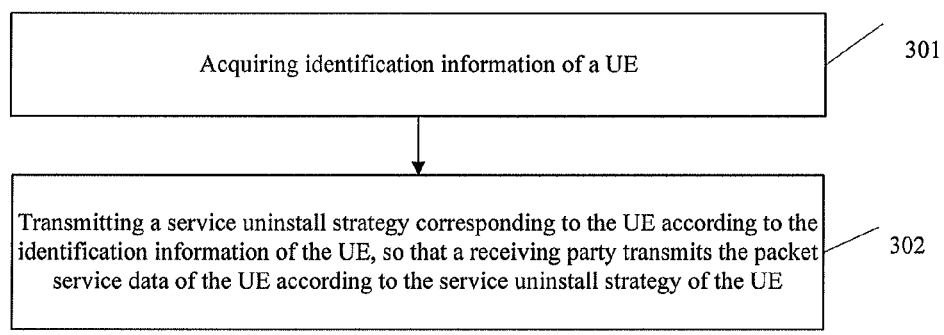
FIG. 3 illustrates a flowchart of another method for transmitting packet service data according to an embodiment of the present disclosure.

As illustrated in FIG. 3, an embodiment of the present disclosure further provides a method for transmitting packet service data, including:

Step 301: acquiring identification information of a UE;

Step 302: transmitting a service uninstall strategy corresponding to the UE according to the identification information of the UE, thereby enabling a receiving party to transmit packet service data of the UE according to the service uninstall strategy of the UE.

The method for transmitting packet service data provided by the embodiment of the present disclosure can transmit corresponding service uninstall strategy to the UE according to the identification information of the UE thereby enabling the receiving party to transmit part of the packet service data to a packet data network via the metropolitan-area network and the IP backbone network according to the service uninstall strategy of the UE, thereby achieving the objects of saving the operation and maintenance cost of the packet network, and overcoming the problem of a high operation and maintenance cost of the packet network when the packet service data (e.g., the Internet service data) occupying a large bandwidth are transmitted, which is caused by that all packet service data transmitted by the UE need to be transmitted via the mobile backhaul, the RNC, the SGSN, the IP backbone network and the GGSN in the prior art.

In order that the persons skilled in the art can more clearly understand the solutions provided by the embodiment of the present disclosure, the method for transmitting packet service data provided by the embodiment of the present disclosure will be described in detail below by using specific embodiments.

Figure 4:
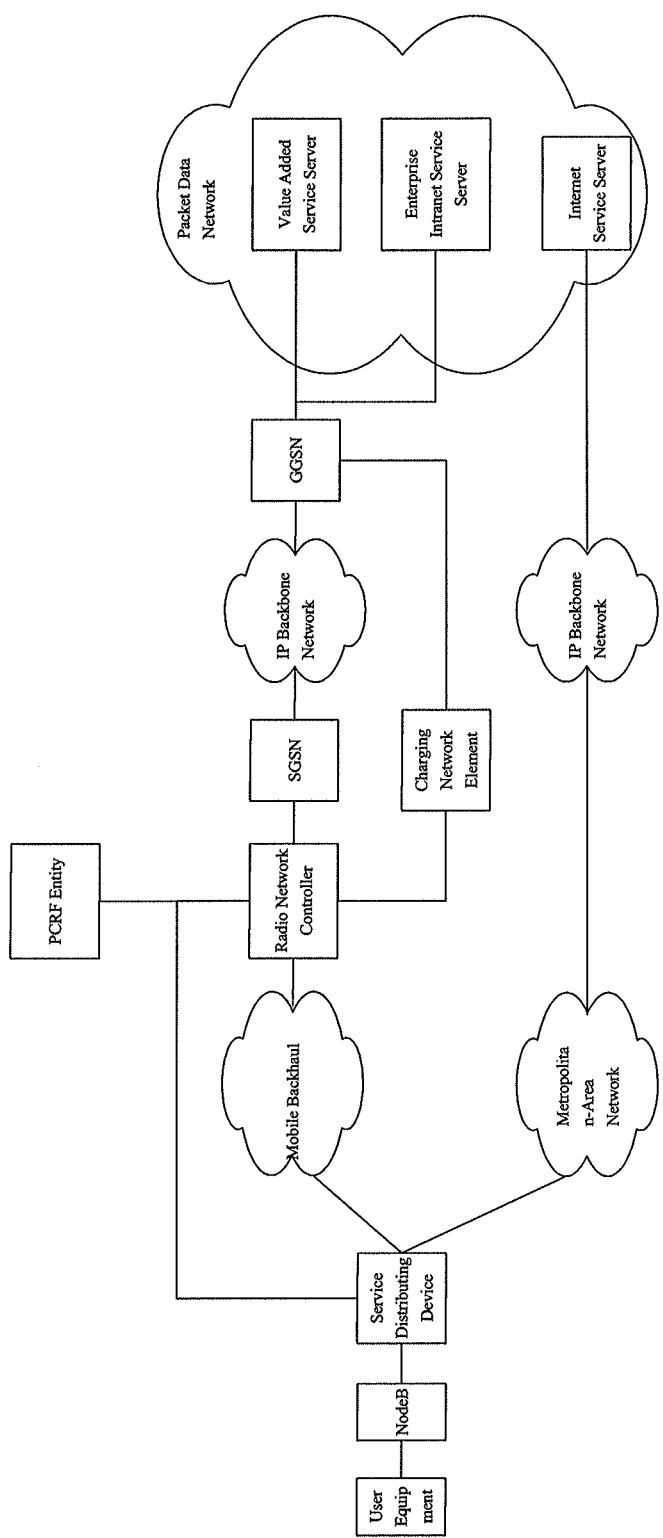
FIG. 4 illustrates an architecture diagram of the network for transmitting packet service data according to an embodiment of the present disclosure.
Figure 5:
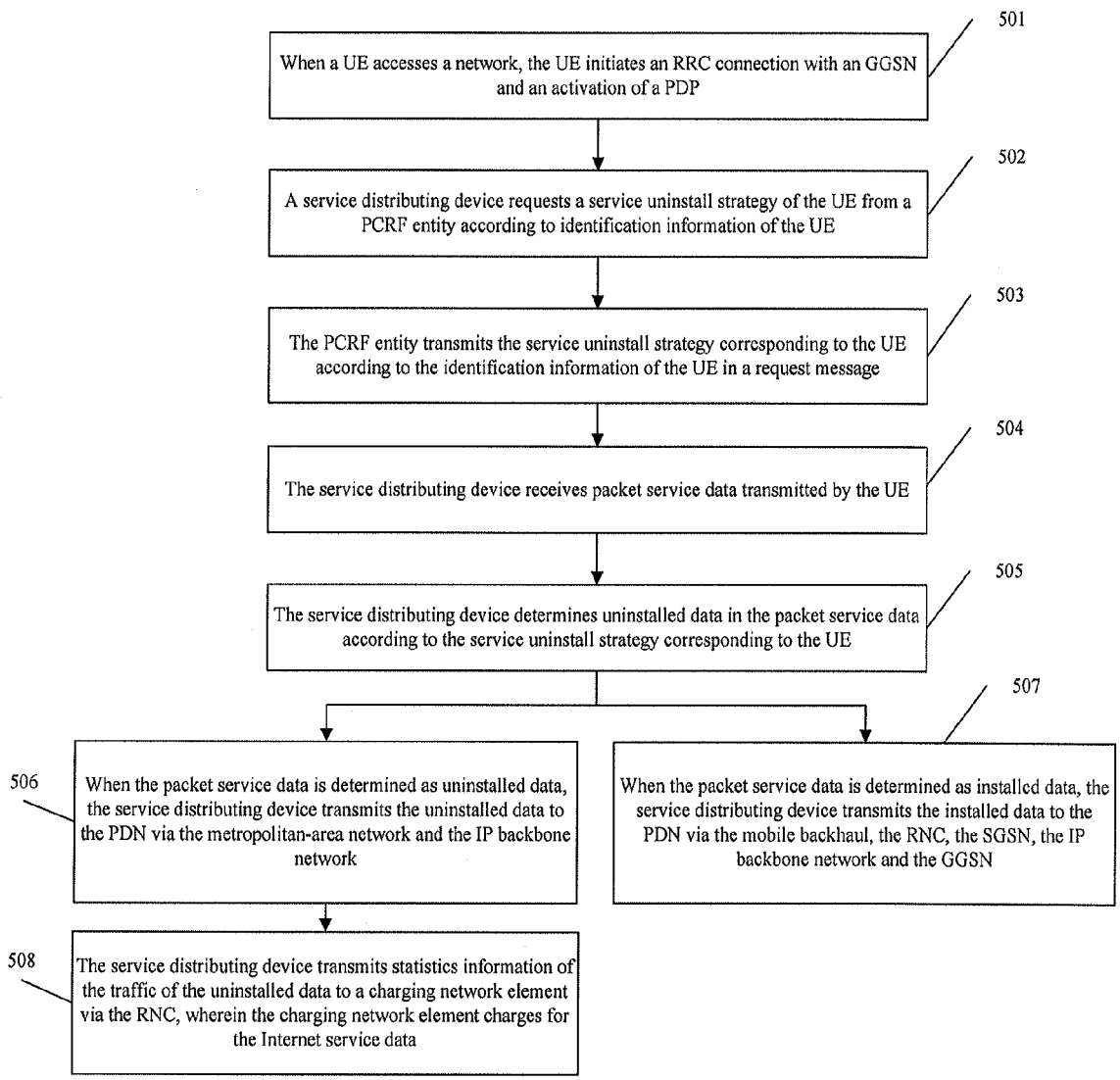
FIG. 5 illustrates a flowchart of a method for transmitting packet service data according to another embodiment of the present disclosure.

The method for transmitting packet service data provided by another embodiment of the present disclosure may be applied to the network architecture as illustrated in FIG. 4. As illustrated in FIG. 4, a UE is located within the region covered by a macro cell, and the service distributing device can transmit the packet service data transmitted by the UE to a PDN via two paths, where one path is that the packet service data is transmitted through the metropolitan-area network and the IP backbone network, and for the convenience of description, the packet service data transmitted via this path is referred to as uninstalled data, and the other path is that the packet service data is transmitted via the mobile backhaul, the RNC, the SGSN, the IP backbone network and the GGSN, and for the convenience of description, the packet service data transmitted via this path is referred to as installed data. The specific process thereof is as illustrated in FIG. 5:

Step 501: when a UE accesses a network, the UE initiates an RRC connection with a GGSN and an activation of a Packet Data Protocol (PDP);

Step 502: a service distributing device requests a service uninstall strategy of the UE from a Policy and Charging Rule Function (PCRF) entity according to identification information of the UE;

Wherein, the identification information of the UE is an International Mobile Subscriber Identity (IMSI), a Packet Temperate Mobile Subscriber Identity (P-TMSI) or an IP address of the UE.

Step 503: the PCRF entity transmits the service uninstall strategy corresponding to the UE according to the identification information of the UE in a request message.

In the embodiment of the present disclosure, the service uninstall strategy corresponding to the UE includes a signaling uninstall strategy and a user uninstall strategy. In the embodiment of the present disclosure, the signaling uninstall strategy is specified as a signaling plane uninstall strategy, and the user uninstall strategy is referred to as a user plane uninstall strategy as well.

The signaling plane uninstall strategy is pre-deployed to the service distributing device by the PCRF entity, and is suitable to all users. The user plane uninstall strategy is determined according to different user information.

Wherein, when configuring corresponding service uninstall strategy for each data service initiated by each UE, the PCRF entity needs to set up an association relation between the UE and the service uninstall strategy.

The signaling plane strategy is configured according to the destination address of the packet service data and the access method of the UE.

The setup of an association relation between the identification information and the IMSI of the UE is described below.

When the UE is attached to the PS, the service distributing device performs a signaling capture to acquire the IMSI information of the UE. During the activation of the PDP initiated by the UE, the service distributing device acquires the P-TMSI information of the UE from the PDP context of the UE. After having acquired the above two kinds of information, the RNC transmits an association relation between the IMSI and P-TMSI of the UE to the PCRF entity. Because the service distributing device, as acquiring the P-TMSI information of the UE, needs to capture an access layer signaling and a non-access layer signaling, respectively, and maintain the association relation between them (e.g., the association relation between the IMSI and P-TMSI), the problem of a high maintenance cost will rise in the practical application.

With respect to the above problem, in the embodiment of the present disclosure the identification information of the UE is preferably an IP address of the UE. The specific process is as follows: after the PDP is activated, the GGSN transmits the association relation between the IMSI and the IP address of the UE to the PCRF entity via a standard Gx interface. During the setup process, the service distributing device needs not to end the RANAP signaling, but rather utilizes the existing network elements and interface information in the network, thereby reducing the cost for maintaining the identification information of the UE.

After the association relation between the UE and the service uninstall strategy is set up, the PCRF entity configures corresponding service uninstall strategy for the UE. Firstly, the signaling plane uninstall strategy is introduced as follows:

determining the service uninstall strategy of the UE according to the network affiliation information of the UE; for example, configuring a strategy for the packet service data of the UE not to be uninstalled when the user is not a local network user, e.g., a roaming user; or determining the service uninstall strategy of the UE according to the position information of the UE; for example, configuring a strategy for the packet service data of the UE not to be uninstalled when the location of the UE continuously moves, e.g., in the subway or train; or determining the service uninstall strategy of the UE according to the service type of the packet service data and the access method of the UE; for example, configuring one or more destination addresses to be the IP addresses of the Internet service (e.g., IP addresses of Sina and Sohu) and information (e.g., URL information) indicating that the service type is Internet service; or configuring one or more destination addresses to be the IP addresses of non Internet service (e.g., WAP service and enterprise VPN network) and information (e.g., URL information) indicating that the service type is non Internet service; or configuring one or more destination addresses to be the IP addresses of Internet service and information indicating that the service type is Internet service, and one or more destination addresses to be the IP addresses of non Internet service and information indicating that the service type is non Internet service; of course, it is also possible to configure one or more services with the access manners thereof being point-to-point connection or one or more services with the access manners thereof being non-point-to-point connection.

In the specific implementation, the signaling plane uninstall strategies can be combined.

The configuration of the user plane uninstall strategy will be introduced below:

determining the service uninstall strategy of the UE according to the service type of the UE; e.g., configuring the packet service data of roaming users and intercepting users not to be uninstalled; or determining the service uninstall of the UE according to the quintuple information of the service; wherein the quintuple information includes source address, source port, destination address, destination port and transmission protocol. One or more information can be selected from the quintuple information as a configuration standard, e.g., data uninstall configuring to the data allocating with a destination port 80 or the like. In the specific implementation, the user plane uninstall strategies can also be combined.

To be noted, after the PCRF entity determines the service uninstall strategy corresponding to the UE, the UE can select the service uninstall strategy through the web portals of operators, where, e.g., charging standards corresponding to services of Quality of Service (QoS) parameters with different levels are provided by the operators, such as the emule service, or the like. After the selection is made by the user, the background system (Boss system or Mobile Data Service Platform (MDSP)) will synchronize the strategy information related to the service uninstall selected by the user to the PCRF entity.

Step 504: the service distributing device receives packet service data transmitted by the UE;

Step 505: the service distributing device determines uninstalled data in the packet service data according to the service uninstall strategy corresponding to the UE;

In the embodiment of the present disclosure, the service distributing device acquires the PDP context of the UE, and uninstalls the packet service data of the UE according to the signaling plane uninstall strategy and the PDP context. For example, when the UE is affiliated to a mobile network and receiving the service of the mobile network, it is allowed to uninstall the packet service data of the UE in case that the QoS priority required by the service is low; when the movement range of the UE is small (e.g., in the shopping mall), it is allowed to uninstall the packet service data of the UE; when the packet service data of the UE includes Internet information, it is allowed to uninstall the packet service data of the UE.

After uninstalling the packet service data according to the signaling plane uninstall strategy, the service distributing device identifies a packet service data stream based on the SPI/DPI, and acquires the quintuple information of the packet service data. For example, the service distributing device parses the packet service data of the UE, determines that the transmission protocol is the HTTP protocol from the packet service data of the L3/L4, and acquires the URL information of the service from the packet service data of the L7.

The uninstall data in the packet service data is determined according to the parsed information and the acquired service uninstall strategy. In order to improve the uninstall speed of the service distributing device, as simultaneously processing the packet service data of a plurality of UEs, the service distributing device can firstly uninstall the packet service data of the plurality of UEs according to a static strategy, and then uninstall the part of uninstalled packet service data of the UEs according to a dynamic strategy. In order to further improve the uninstall speed, an ACL Match function module can be embedded in the service distributing device, and any service that does not satisfy the ACL Match is uninstalled to a metropolitan-area network. For example, the packet service data with a destination IP address 2.2.2.2 is configured not to be uninstalled according to the quintuple information of the packet service data, and configured to be transmitted to the PDN in the original path of the UMTS network; and the packet service data with a port 80 is configured to be uninstalled and transmitted to the PDN via the metropolitan-area network. The specific implementation is shown in the following table:

| MS IP    | MS Port | Server IP | Server Port | L4 Protocol | Offload |
|----------|---------|-----------|-------------|-------------|---------|
| 10.0.0.x | any     | 1.1.1.1   | 80          | HTTP        | Yes     |
| any      | any     | 2.2.2.2   | any         | any         | Not     |

Step 506: when the packet service data is determined as uninstalled data, the service distributing device transmits the uninstalled data to the PDN via the metropolitan-area network and the IP backbone network;

In the embodiment of the present disclosure, after the uninstalled data is transmitted to the metropolitan-area network and the IP backbone network, the service distributing device routes the uninstalled data to a Value Added Service (VAS) entity or a Legal Interception Gateway (LIG), thereby enabling the VAS entity to filter the content of the uninstalled data and the LIG to intercept the uninstalled data, as such, the monitoring the uninstalled data is implemented. After the monitoring of the uninstalled data is completed, the uninstalled data is then transmitted to the PDN.

Step 507: when the packet service data is determined as installed data (e.g., enterprise intranet service data or VAS data), the service distributing device transmits the installed data to the PDN via the mobile backhaul, the RNC, the SGSN, the IP backbone network and the GGSN;

Optionally, since in the solution provided by the embodiment of the present disclosure, the Internet service data are transmitted via the metropolitan-area network and the IP backbone network, in order to charge for the Internet service data, after step 506 the method can further includes:

Step 508: the service distributing device transmits statistics information of the traffic of the uninstalled data to a charging network element via the RNC, wherein the charging network element charges for the Internet service data.

The embodiment of the present disclosure is described with, but not limited to, the service distributing device located between the NodeB and the RNC. The service distributing device may be also located between the RNC and the SSGN, between the SSGN and the GGSN, or behind the GGSN, and it may be further integrated into one device of the NodeB, the RNC, the SSGN or the GGSN as a function module. Accordingly, when the service distributing device is located at any of the above positions, the path for the service distributing device to transmit the uninstalled data to the PDN will be changed. For example, when being located between the RNC and the SSGN, the service distributing device transmits the uninstalled data to the PDN through the IPBB network. To be noted, the embodiment of the present disclosure is described with, but not limited to, an example of uninstalling the packet service data of the UE in the UMTS network, and the method is also suitable to the LTE/SAE network. In the solution, the network equipment for implementing the uninstall function can be the convergence gateway of the LTE/SAE. The method for transmitting packet service data provided by the embodiment of the present disclosure determines the packet service data to be uninstalled in the packet service data according to the service uninstall strategy of the UE, and transmits the packet service data to be uninstalled to the PDN via the metropolitan-area network and the IP backbone network, thereby achieving the objects of saving the operation and maintenance cost of the packet network, shortening the transmission delay of the packet service data to be uninstalled, improving the transmission rate of the packet service data to be uninstalled, and overcoming the problem of a high operation and maintenance cost of the packet network when the packet service data (e.g., the Internet service data) occupying a large bandwidth are transmitted, which is caused by that all packet service data transmitted by the UE need to be transmitted via the mobile backhaul, the RNC, the SGSN, the IP backbone network and the GGSN in the prior art and that the packet service data of the UE are transmitted via the mobile backhaul, the RNC, the SGSN, the IP backbone network and the GGSN in the prior art. By transmitting part of the packet service data of the UE to the PDN via the metropolitan-area network and the IP backbone network, the transmission load of the mobile backhaul, the RNC, the SGSN, the IP backbone network and the GGSN is reduced, thereby achieving the object of saving the maintenance cost of the network. By receiving the configuration of the service uninstall strategy by the UE, the personalized demands of different users on the transmission rate can be satisfied, thereby improving the QoS of the network. By determining whether or not to uninstall the packet service data according to the quintuple information of the packet service data, the uninstalling speed and the transmission rate are both improved, thereby achieving the object of shortening the transmission delay. By monitoring the uninstalled data, the network security is ensured, and the user's service experience is improved.

Figure 6:
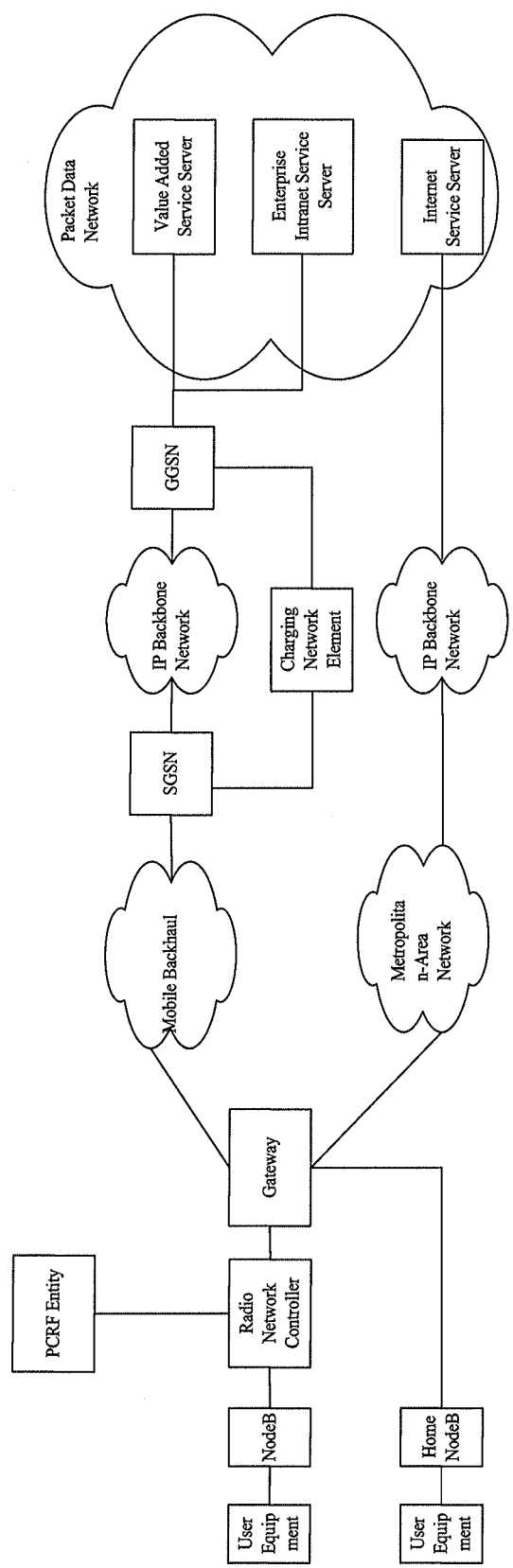
FIG. 6 illustrates an architecture diagram of the network for transmitting packet service data according to another embodiment of the present disclosure.

As illustrated in FIG. 6, another embodiment of the present disclosure further provides a method for transmitting packet service data. Differing from the above embodiments, this embodiment can not only uninstall the packet service data of the UE in a macro cell, but also can be suitable to the UEs in a micro cell. The service distributing device for implementing the uninstall function can be connected to the RNC through a standard Iu port, and connected to the home NodeB through an eIu port.

The method for transmitting packet service data provided by the embodiment of the present disclosure determines the packet service data to be uninstalled in the packet service data according to the service uninstall strategy of the UE, and transmits the packet service data to be uninstalled to the PDN via the metropolitan-area network and the IP backbone network, thereby achieving the objects of saving the operation and maintenance cost of the packet network, shortening the transmission delay of the packet service data to be uninstalled, improving the transmission rate of the packet service data to be uninstalled, and overcoming the problem of a high operation and maintenance cost of the packet network when the packet service data (e.g., the Internet service data) occupying a large bandwidth are transmitted, which is caused by that all packet service data transmitted by the UE need to be transmitted via the mobile backhaul, the RNC, the SGSN, the IP backbone network and the GGSN in the prior art and that the packet service data of the UE are transmitted via the mobile backhaul, the RNC, the SGSN, the IP backbone network and the GGSN in the prior art. By transmitting part of the packet service data of the UE to the PDN via the metropolitan-area network and the IP backbone network, the transmission load of the mobile backhaul, the RNC, the SGSN, the IP backbone network and the GGSN is reduced, thereby achieving the objective of saving the maintenance cost of the network. By receiving the configuration of the service uninstall strategy by the UE, the personalized demands of different users on the transmission rate can be satisfied, thereby improving the QoS of the network. By determining whether or not to uninstall the packet service data according to the quintuple information of the packet service data, the uninstalling speed and the transmission rate are both improved, thereby achieving the objective of shortening the transmission delay. By monitoring the uninstalled data, the network security is ensured, and the user's service experience is improved. By uninstalling the packet service data of the UE in the range covered by the micro cell, the transmission load of the mobile backhaul, the RNC, the SGSN, the IP backbone network and the GGSN are further reduced, the maintenance cost of the network is decreased while the transmission rate of the packet service data in the range covered by the micro cell is increased.

Figure 7:
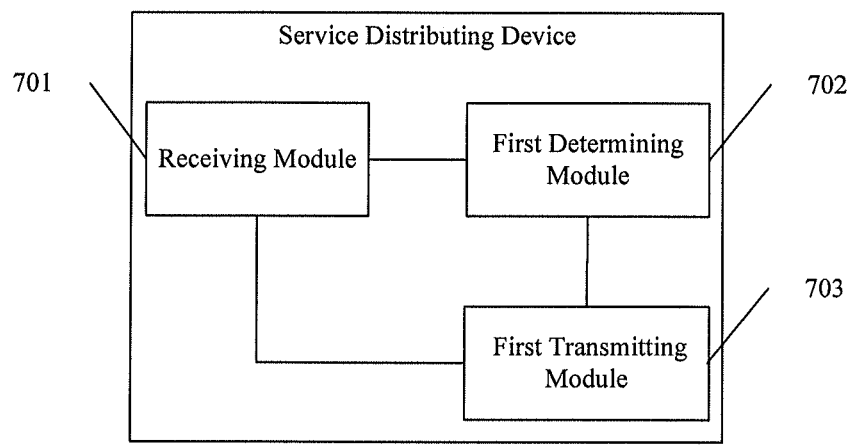
FIG. 7 illustrates a structure diagram of the service distributing device according to an embodiment of the present disclosure.

As illustrated in FIG. 7, the embodiment of the present disclosure further provides a service distributing device, including:

a receiving module 701 configured to receive packet service data transmitted by a UE;

a determining module 702 configured to determine packet service data to be uninstalled in the packet service data received by the receiving module according to a service uninstall strategy of the UE, wherein the service uninstall strategy is generated according to user information or signaling information of a service distributing point; and a transmitting module 703 configured to transmit the packet service data to be uninstalled determined by the determining module to a Packet Data Network (PDN).

Figure 8:
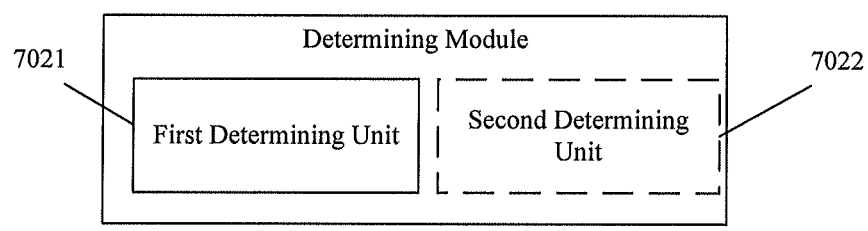
FIG. 8 illustrates a structure diagram of the determining module in the embodiment as illustrated in FIG. 7.

Further, as illustrated in FIG. 8, the determining module 702 may also include:

a first determining unit 7021 configured to acquire Packet Data Protocol (PDP) context of the UE when the service uninstall strategy of the UE is a signaling uninstall strategy and determine the packet service data to be uninstalled according to the signaling uninstall strategy of the UE and the acquired PDP context; or a second determining unit 7022 configured to acquire content information of the packet service data using a deep packet inspection technique when the service uninstall strategy of the UE is a user uninstall strategy and determine the packet service data to be uninstalled according to the service uninstall strategy of the UE and the acquired content information.

Figure 9:
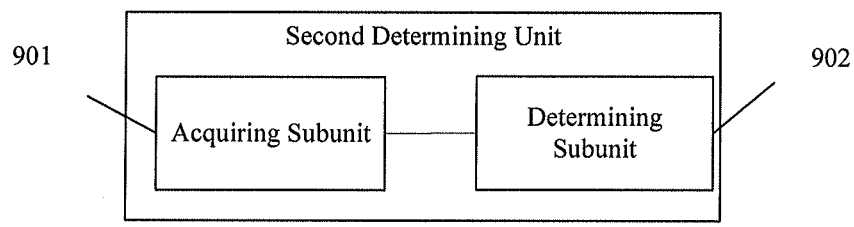
FIG. 9 illustrates a structure diagram of the second determining unit in the embodiment as illustrated in FIG. 8.

Further, as illustrated in FIG. 9, the second determining unit may also include:

an acquiring subunit 901 configured to acquire quintuple information of the packet service data, wherein the quintuple information includes a source address, a source port, a destination address, a destination port and a transmission protocol;

a determining subunit 902 configured to determine the packet service data to be uninstalled according to a pre-acquired service uninstall strategy and the quintuple information acquired by the acquiring subunit.

Further, the transmitting module 703 may also include:

a re-routing unit configured to route the packet service data to be uninstalled to a Value Added Service (VAS) entity or a Legal Interception Gateway (LIG), so that the VAS entity or the LIG monitors the packet service data to be uninstalled.

In the embodiment of the present disclosure, the service distributing device is a Node B, an RNC, an SSGN or a GGSN.

The service distributing device provided by the embodiment of the present disclosure can be used in conjunction with the method provided by the embodiments of the present disclosure, and the service distributing device determines the packet service data to be uninstalled in the packet service data according to the service uninstall strategy of the UE, and transmits the packet service data to be uninstalled to the PDN via the metropolitan-area network and the IP backbone network, thereby achieving the objects of saving the operation and maintenance cost of the packet network, shortening the transmission delay of the packet service data to be uninstalled, improving the transmission rate of the packet service data to be uninstalled, and overcoming the problem of a high operation and maintenance cost of the packet network when the packet service data (e.g., the Internet service data) occupying a large bandwidth are transmitted, which is caused by that all packet service data transmitted by the UE need to be transmitted via the mobile backhaul, the RNC, the SGSN, the IP backbone network and the GGSN in the prior art. By transmitting part of the packet service data of the UE to the PDN via the metropolitan-area network and the IP backbone network, the transmission load of the mobile backhaul, the RNC, the SGSN, the IP backbone network and the GGSN is reduced, thereby achieving the objective of saving the maintenance cost of the network. By receiving the configuration of the service uninstall strategy by the UE, the personalized demands of different users on the transmission rate can be satisfied, thereby improving the QoS of the network. By determining whether or not to uninstall the packet service data according to the quintuple information of the packet service data, the uninstalling speed and the transmission rate are both improved, thereby achieving the objective of shortening the transmission delay. By monitoring the uninstalled data, the network security is ensured, and the user's service experience is improved. By uninstalling the packet service data of the UE in the range covered by the micro cell, the transmission load of the mobile backhaul, the RNC, the SGSN, the IP backbone network and the GGSN is further reduced, and the maintenance cost of the network is decreased while the transmission rate of the packet service data in the range covered by the micro cell is increased.

Figure 10:
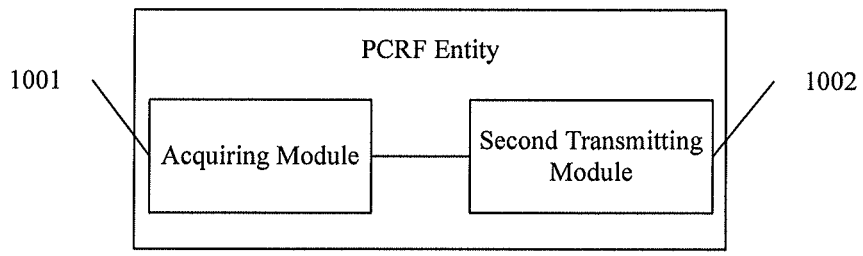
FIG. 10 illustrates is a structure diagram of the PCRF entity according to an embodiment of the present disclosure.

As illustrated in FIG. 10, a PCRF entity provided by the embodiment of the present disclosure includes:

an acquiring module 1001 configured to acquire identification information of a UE;

a transmitting module 1002 configured to transmit a service uninstall strategy corresponding to the UE according to the identification information of the UE acquired by the acquiring module thereby enabling a receiving party to transmit the packet service data of the UE according to the service uninstall strategy of the UE.

Figure 11:
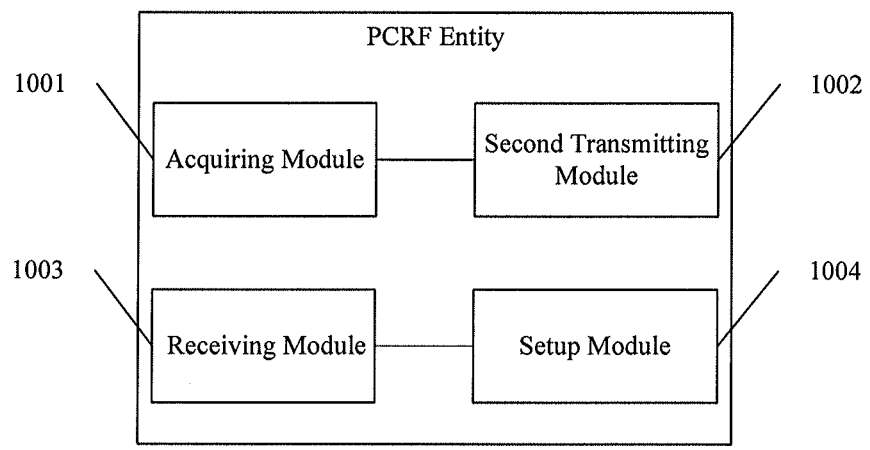
FIG. 11 illustrates another structure diagram of the PCRF entity in the embodiment as illustrated in FIG. 10.

Further optionally, as illustrated in FIG. 11, the PCRF entity can further include:

a receiving module 1003 configured to receive a message that carries an IMSI and an IP address of the UE transmitted by the GGSN, from a interface between the PCRF entity and the bearer network;

a setup module 1004 configured to set up an association relation between the IMSI and the IP address of the UE in the message.

Figure 12:
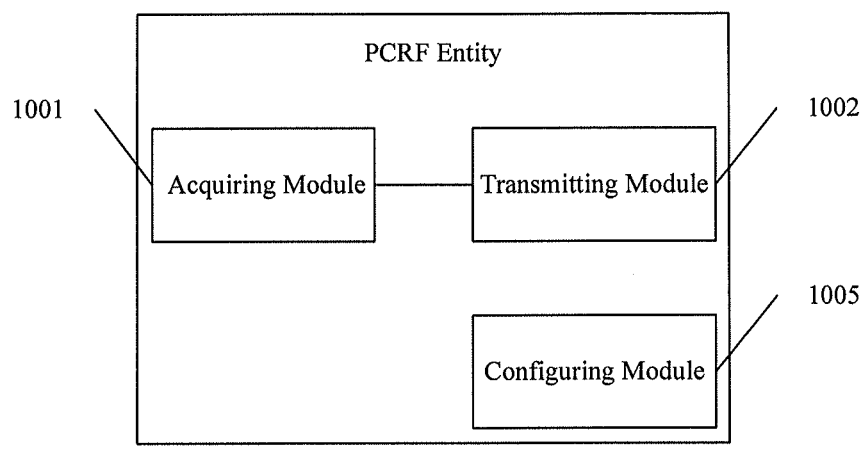
FIG. 12 illustrates still another structure diagram of the PCRF entity in the embodiment as illustrated in FIG. 10.

Further optionally, as illustrated in FIG. 12, the PCRF entity can further include:

a configuring module 1005 configured to configure the service uninstall strategy of the UE according to network affiliation information of the UE; or configure the service uninstall strategy of the UE according to position information of the UE; or configure the service uninstall strategy of the UE according to a service type of the packet service data and an access method of the UE; or configure the service uninstall strategy of the UE according to a service type of the UE; or configure the service uninstall strategy of the UE according to quintuple information of the packet service data, wherein the quintuple information includes source address, source port, destination address, destination port and transmission protocol.

The PCRF entity provided by the embodiment of the present disclosure can be used in conjunction with the method provided by the embodiment of the present disclosure, thereby achieving the objects of saving the operation and maintenance cost of the packet network, shortening the transmission delay of the packet service data to be uninstalled, improving the transmission rate of the packet service data to be uninstalled, and overcoming the problem of a high operation and maintenance cost of the packet network when the packet service data (e.g., the Internet service data) occupying a large bandwidth are transmitted, which is caused by that all packet service data transmitted by the UE need to be transmitted via the mobile backhaul, the RNC, the SGSN, the IP backbone network and the GGSN in the prior art. The PCRF entity determines the service uninstall strategy of the UE according to the subscription information of the UE, thereby improving the transmission rate of the packet service data without increasing the network load. The PCRF entity determines the service uninstall strategy of the UE according to the destination address of the packet service data and the access method of the UE, thereby reducing the transmission load of the mobile backhaul, the RNC, the SGSN, the IP backbone network and the GGSN.

Figure 13:
FIG. 13 illustrates a structure diagram of the communication system according to an embodiment of the present disclosure.

In addition, as illustrated in FIG. 13, the embodiment of the present disclosure further provides a communication system, including:

a service distributing device 1301 configured to receive packet service data transmitted by a UE, determine packet service data to be uninstalled in the packet service data according to a service uninstall strategy of the UE, wherein the service uninstall strategy is generated according to user information or signaling information of a service distributing point, and transmit the determined packet service data to be uninstalled to a PDN; and a PCRF entity 1302 configured to acquire identification information of the UE, and transmit the service uninstall strategy corresponding to the UE according to the identification information of the UE, thereby enabling a receiving party to transmit the packet service data of the UE according to the service uninstall strategy of the UE.

In the communication system provided by the embodiment of the present disclosure, the service distributing device can not only uninstall the packet service data of the NodeB but also uninstall the packet service data of the home NodeB. During the process of uninstalling the packet service data, the service distributing device can further route the packet service data to the VAS entity or the LIG, so that the VAS entity or the LIG monitors the packet service data to be uninstalled.

The communication system provided by the embodiment of the present disclosure can be used in conjunction with the method and device provided by the present disclosure, and the communication system determines the packet service data to be uninstalled in the packet service data according to the service uninstall strategy of the UE, and transmits the packet service data to be uninstalled to the PDN via the metropolitan-area network and the IP backbone network, thereby achieving the objects of saving the operation and maintenance cost of the packet network, shortening the transmission delay of the packet service data to be uninstalled, improving the transmission rate of the packet service data to be uninstalled, and overcoming the problem of a high operation and maintenance cost of the packet network when the packet service data (e.g., the Internet service data) occupying a large bandwidth are transmitted, which is caused by that all packet service data transmitted by the UE need to be transmitted via the mobile backhaul, the RNC, the SGSN, the IP backbone network and the GGSN in the prior art. By transmitting part of the packet service data of the UE to the PDN via the metropolitan-area network and the IP backbone network, the transmission load of the mobile backhaul, the RNC, the SGSN, the IP backbone network and the GGSN is reduced, thereby achieving the objective of saving the maintenance cost of the network. By receiving the configuration of the service uninstall strategy by the UE, the personalized demands of different users on the transmission rate can be satisfied, thereby improving the QoS of the network. By determining whether or not to uninstall the packet service data according to the quintuple information of the packet service data, the uninstalling speed and the transmission rate are both improved, thereby achieving the objective of shortening the transmission delay. By monitoring the uninstalled data, the network security is ensured, and the user's service experience is improved. By uninstalling the packet service data of the UE in the range covered by the micro cell, the transmission load of the mobile backhaul, the RNC, the SGSN, the IP backbone network and the GGSN is further reduced, and the maintenance cost of the network is decreased while the transmission rate of the packet service data in the range covered by the micro cell is increased.

The persons skilled in the art could understand that all or part of the steps in the methods according to the above embodiments can be implemented by instructing relevant hardware such as a server having a processor through a program that may be stored in a computer readable storage medium and include one or a combination of the steps in the method embodiments when executed. The computer readable storage medium is accessible by the relevant hardware.

The person skilled in the art could understand that all or part of the flows in the methods according to the above embodiments can be implemented by instructing relevant hardware through a program that may be stored in a computer readable storage medium and include the flows of the above method embodiments when executed, wherein the storage medium may be magnetic disk, optical disk, Read-Only Memory (ROM) or Random Access Memory (RAM), or the like.

What is claimed is:

1. A method for transmitting packet service data, comprising:
   receiving the packet service data transmitted by a User Equipment (UE);
   determining packet service data to be uninstalled in the packet service data according to a service uninstall strategy of the UE, wherein the service uninstall strategy is generated according to user information or signaling information of a service distributing point; and
   transmitting the determined packet service data to be uninstalled to a Packet Data Network (PDN),
   wherein determining packet service data to be uninstalled in the packet service data according to the service uninstall strategy of the UE comprises:
   acquiring Packet Data Protocol (PDP) context of the UE when the service uninstall strategy of the UE comprises a signaling uninstall strategy; and determining the packet service data to be uninstalled according to the signaling uninstall strategy and the acquired PDP context; or
   acquiring content information of the packet service data using a deep packet inspection method when the service uninstall strategy of the UE comprises a user strategy; and determining the packet service data to be uninstalled according to the service uninstall strategy of the UE and the acquired content information;
   wherein, when the service uninstall strategy of the UE comprises the user uninstall strategy, the method further comprises:
   acquiring quintuple information of the packet service data, wherein the quintuple information comprises a source address, a source port, a destination address, a destination port, and a transmission protocol; and
   determining the packet service data to be uninstalled according to the service uninstall strategy of the UE and the acquired quintuple information.

2. The method according to claim 1, wherein, the service uninstall strategy of the UE is configured by a Policy and Charging Rule Function (PCRF) entity or configured by the UE through the PCRF entity.

3. The method according to claim 1, wherein transmitting the determined packet service data to be uninstalled to a PDN comprises:
   routing the packet service data to be uninstalled to a Value Added Service (VAS) entity or a Legal Interception Gateway (LIG) thereby enabling the VAS entity or the LIG to monitor the packet service data to be uninstalled.

4. The method according to claim 1, wherein transmitting the determined packet service data to be uninstalled to the PDN comprises:
   transmitting the determined packet service data to be uninstalled to the PDN via a metropolitan-area network and an IP backbone network.

5. A method for transmitting packet service data, comprising:
   acquiring an identification of a User Equipment (UE); and
   transmitting a service uninstall strategy corresponding to the UE according to the identification of the UE thereby enabling a receiving party to transmit packet service data of the UE according to the service uninstall strategy of the UE,
   wherein, the identification of the UE comprises at least one of the following: an International Mobile Subscriber Identity (IMSI), a Packet Temperate Mobile Subscriber Identity (P-TMSI), and an IP address of the UE;
   wherein, when the identification of the UE comprises the IP address of the UE, the method further comprises:
   receiving a message that carries the IMSI and the IP address of the UE transmitted by a Gateway GPRS Support Node (GGSN), from an interface between a Policy and Charging Rule Function (PCRF) entity and a bearer network; and
   setting up an association relation between the IMSI and the IP address of the UE in the message.

6. The method according to claim 5, further comprising:
   configuring the service uninstall strategy of the UE according to at least one of the following:
   network affiliation information of the UE, position information of the UE, a service type of the packet service data and an access method of the UE, a service type of the UE, and quintuple information of the packet service data,
   wherein the quintuple information comprises a source address, a source port, a destination address, a destination port, and a transmission protocol.

7. A service distributing device, comprising a processor, wherein the processor is coupled with memory comprising instructions which when executed by the processor cause the processor to:
   receive packet service data transmitted by a User Equipment (UE);
   determine packet service data to be uninstalled in the received packet service data according to a service uninstall strategy of the UE, wherein the service uninstall strategy is generated according to user information or signaling information of a service distributing point; and
   transmit the determined packet service data to be uninstalled to a Packet Data Network (PDN),
   wherein, when determining packet service data to be uninstalled in the packet service data, the processor is further caused to
   acquire Packet Data Protocol (PDP) context of the UE when the service uninstall strategy of the UE is a signaling plane uninstall strategy and determine the packet service data to be uninstalled according to the signaling plane uninstall strategy and the acquired PDP context; or
   acquire content information using a deep packet inspection technique when the service uninstall strategy of the UE is a user plane uninstall strategy and determine the packet service data to be uninstalled according to the service uninstall strategy of the UE and the acquired content information;
   wherein, when acquiring content information, the processor is further caused to:
   acquire quintuple information of the packet service data, wherein the quintuple information comprises a source address, a source port, a destination address, a destination port and a transmission protocol; and
   determine the packet service data to be uninstalled according to the service uninstall strategy of the UE and the quintuple information acquired by the processor.

8. The service distributing device according to claim 7, wherein when transmitting the determined packet service data to be uninstalled, the processor is further caused to:

route the packet service data to be uninstalled to a Value Added Service (VAS) entity or a Legal Interception Gateway (LIG), thereby enabling the VAS entity or the LIG to monitor the service data to be uninstalled.

9. The service distributing device according to claim 7, wherein the service distributing device comprises one of the following: a NodeB, a Radio Network Controller (RNC), a Serving GPRS Support Node (SGSN), and a Gateway GPRS Support Node (GGSN).

10. A Policy and Charging Rule Function (PCRF) entity, comprising a processor, wherein the processor is coupled with memory comprising instructions which when executed by the processor cause the processor:
acquire an identification of a User Equipment (UE);
transmit a service uninstall strategy corresponding to the UE according to the acquired identification of the UE, thereby enabling a receiving party to transmit packet service data of the UE according to the service uninstall strategy of the UE,
wherein, when the identification of the UE is an IP address of the UE, the processor is further caused to:
receive a message that carries an International Mobile Subscriber Identity (IMSI) and the IP address of the UE transmitted by a Gateway GPRS Support Node (GGSN), from an interface between the PCRF entity and a bearer network; and
set up an association relation between the IMSI and the IP address of the UE in the message.

11. The PCRF entity according to claim 10, wherein the processor is further caused to:
configure the service uninstall strategy of the UE according to at least one of the following:
network affiliation information of the UE, position information of the UE, a service type of the packet service data and a access method of the UE, a service type of the UE, and quintuple information of the packet service data,
wherein the quintuple information comprises source address, source port, destination address, destination port, and transmission protocol.

12. A communication system, comprising:
a service distributing device comprising a processor, wherein the processor is coupled with memory comprising instructions which when executed by the processor cause the processor to:
receive packet service data transmitted by a User Equipment (UE);
determine packet service data to be uninstalled in the received packet service data according to a service uninstall strategy of the UE, wherein the service uninstall strategy is generated according to user information or signaling information of a service distributing point; and
transmit the determined packet service data to be uninstalled to a Packet Data Network (PDN),
wherein, when acquiring content information, the processor is further caused to:
acquire quintuple information of the packet service data, wherein the quintuple information comprises a source address, a source port, a destination address, a destination port and a transmission protocol; and
determine the packet service data to be uninstalled according to the service uninstall strategy of the UE and the quintuple information acquired by the acquiring subunit; and
a Policy and Charging Rule Function (PCRF) entity comprising a processor, wherein the processor is coupled with memory comprising instructions which when excited by the processor cause the processor to:
acquire an identification of a User Equipment (UE);
transmit a service uninstall strategy corresponding to the UE according to the acquired identification of the UE, thereby allowing a receiving party to transmit packet service data of the UE according to the service uninstall strategy of the UE,
wherein, when the identification of the UE is an IP address of the UE, the processor is further caused to:
receive a message that carries an International Mobile Subscriber Identity (IMSI) and the IP address of the UE transmitted by a Gateway GPRS Support Node (GGSN), from an interface between the PCRF entity and a bearer network; and
set up an association relation between the IMSI and the IP address of the UE in the message.

13. The communication system according to claim 12, wherein, when determining packet service data to be uninstalled in the packet service data, the processor of the service distributing device is further caused to:
acquire Packet Data Protocol (PDP) context of the UE when the service uninstall strategy of the UE is a signaling plane uninstall strategy and determine the packet service data to be uninstalled according to the signaling plane uninstall strategy and the acquired PDP context; or
acquire content information using a deep packet inspection technique when the service uninstall strategy of the UE is a user plane uninstall strategy and determine the packet service data to be uninstalled according to the service uninstall strategy of the UE and the acquired content information.

14. The communication system according to claim 12, wherein when transmitting the determined packet service data to be uninstalled, the processor of the service distributing device is further caused to:
route the packet service data to be uninstalled to a Value Added Service (VAS) entity or a Legal Interception Gateway (LIG), thereby enabling the VAS entity or the LIG to monitor the packet service data to be uninstalled.

15. The communication system according to claim 12, wherein the service distributing device comprises one of the following: a NodeB, a Radio Network Controller (RNC), a Serving GPRS Support Node (SGSN), and a Gateway GPRS Support Node (GGSN).

16. The communication system according to claim 12, wherein, the processor of the PCRF entity is further caused to:
configure the service uninstall strategy of the UE according to at least one of the following:
network affiliation information of the UE, position information of the UE, a service type of the packet service data and a access method of the UE, a service type of the UE, and quintuple information of the packet service data,
wherein the quintuple information comprises source address, source port, destination address, destination port, and transmission protocol.

* * * * *

UNITED STATES PATENT AND TRADEMARK OFFICE
CERTIFICATE OF CORRECTION

PATENT NO. : 9,220,120 B2  Page 1 of 1
APPLICATION NO. : 13/339199
DATED : December 22, 2015
INVENTOR(S) : Shujuan Wang et al.

It is certified that error appears in the above-identified patent and that said Letters Patent is hereby corrected as shown below:

<u>In the Claims</u>

In column 13, claim 1, line 32, after "comprises a user" insert --uninstall--.

In column 15, claim 8, line 4, before "service data to be uninstalled." insert --packet--.

Signed and Sealed this
Nineteenth Day of April, 2016

Michelle K. Lee
*Director of the United States Patent and Trademark Office*